J. M. MICHAELSON.
MOTOR CYCLE FRAME.
APPLICATION FILED JAN. 9, 1912.
1,047,430.
Patented Dec. 17, 1912.
2 SHEETS—SHEET 2.
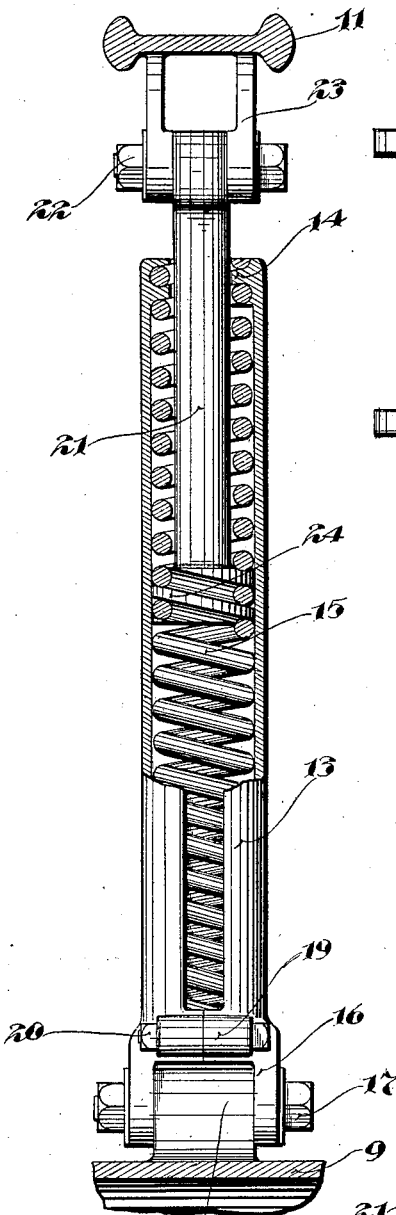
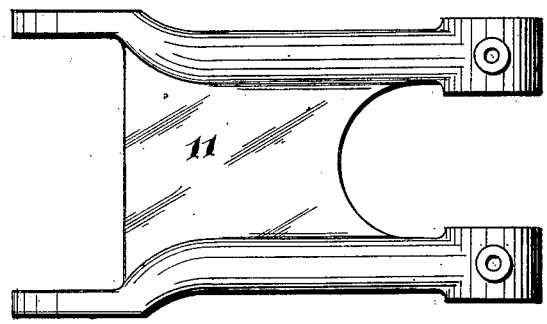
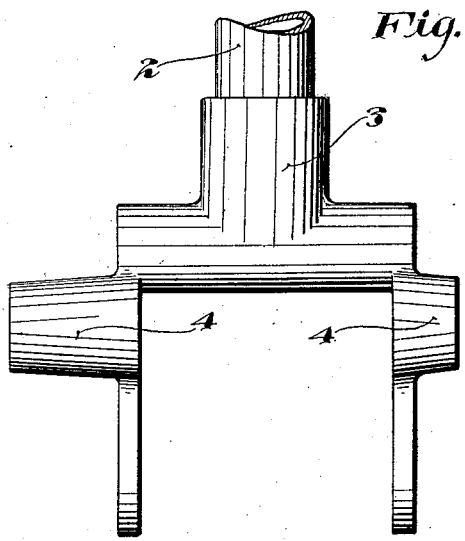
Witnesses:
E. C. Skinkle
Geo. Knutson
Inventor:
Joseph M. Michaelson
By his Attorneys;
Williamson Merchant

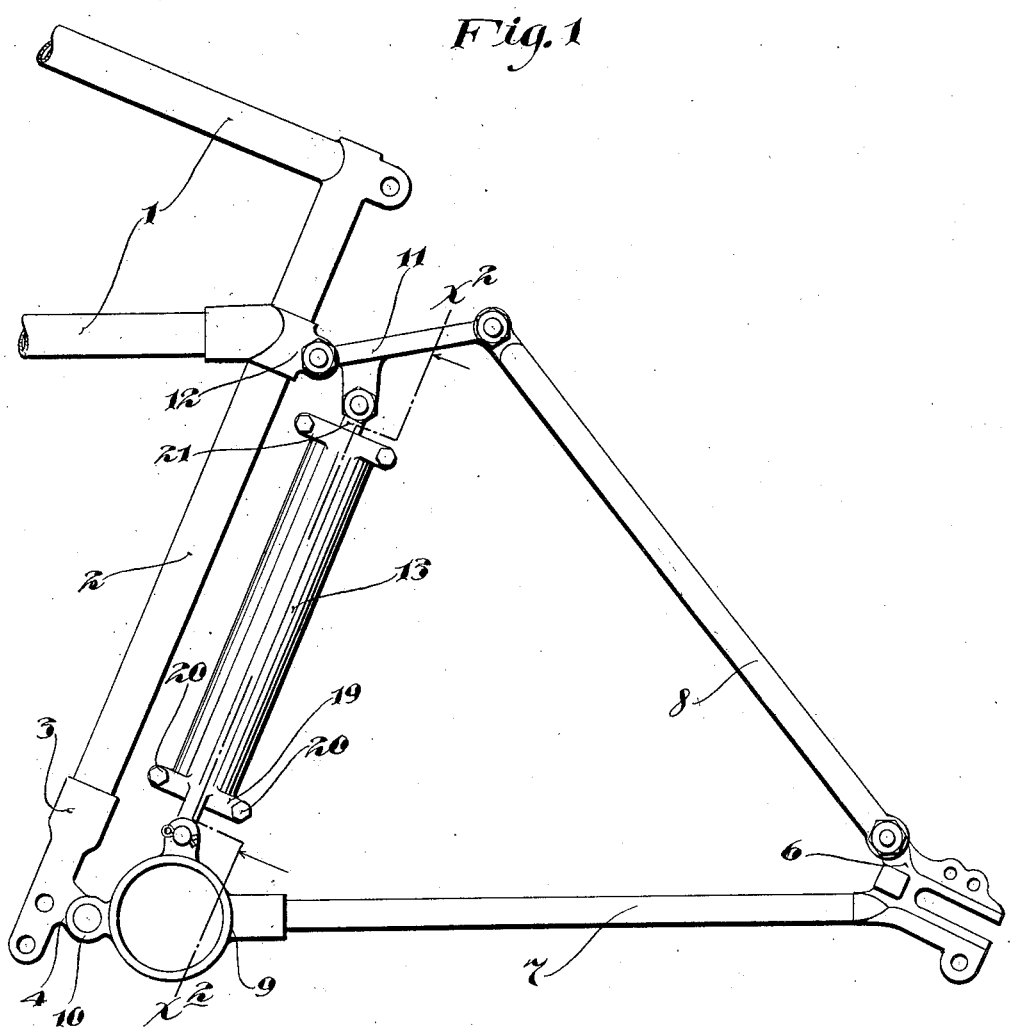

UNITED STATES PATENT OFFICE.

JOSEPH M. MICHAELSON, OF MINNEAPOLIS, MINNESOTA, ASSIGNOR, BY MESNE ASSIGNMENTS, TO MINNEAPOLIS MOTOR COMPANY, OF MINNEAPOLIS, MINNESOTA, A CORPORATION OF MINNESOTA.

MOTOR-CYCLE FRAME.

1,047,430.  Specification of Letters Patent.  Patented Dec. 17, 1912.

Application filed January 9, 1912.  Serial No. 670,133.

*To all whom it may concern:*

Be it known that I, JOSEPH M. MICHAELSON, a citizen of the United States, residing at Minneapolis, in the county of Hennepin and State of Minnesota, have invented certain new and useful Improvements in Motor-Cycle Frames; and I do hereby declare the following to be a full, clear, and exact description of the invention, such as will enable others skilled in the art to which it appertains to make and use the same.

My invention has for its object to improve the construction of motor cycles and bicycle frames, and is directed particularly to an improved arrangement of the cushioning spring connection whereby the frame is made resilient, and hence, easy riding and free from shocks and jars when running over rough roads.

Generally stated, the invention consists of the novel devices, combinations of devices and arrangement of parts hereinafter described and defined in the claims.

The invention is illustrated in the accompanying drawings wherein like characters indicate like parts throughout the several views.

Referring to the drawings, Figure 1 is a view in side elevation showing portions of a bicycle or motor cycle frame having my invention embodied therein; Fig. 2 is a section taken approximately on the irregular line on Fig. 1; Fig. 3 is a plan view of the so-called frame coupling link; Fig. 4 is a detail view in rear elevation showing the pronged head at the lower end of the seat post 2 of the main frame; and Fig. 5 is a detail showing the spring engaging head of the plunger of the cushioning device.

The main or front section 1 of the machine frame, may be of the usual or any suitable construction, but its seat post tube 2 is shown as provided at its lower end with a rigidly secured bifurcated head 3 having rearwardly offset laterally spaced lugs 4. The rear frame section is made up of the usual rear forks 6, to which forwardly extended lower tubes 7 are rigidly secured, and to which the rear ends of the inclined upper tubes 8 are pivotally attached. The lower tubes 7, at their front ends, are rigidly secured to projecting sleeves of a crank shaft casing 9, which, at its front side is provided with lugs 10 that are pivotally connected to the lugs 4 of the heretofore noted bifurcated head 3. The frame coupling link 11, which, as shown, is a wide faced member with bifurcated ends, is pivotally connected to the upper ends of the tubes 8 and to a rigidly secured lug 12 on the seat post tube 2.

In accordance with my invention, I provide a cushioning device involving novel construction *per se*, and furthermore, I employ a cushioning connection which is applied directly between the so-called frame coupling link 11 or its equivalent, and the crank shaft casing or adjacent part that moves with the said crank shaft casing. This cushioning connection, as preferably constructed, involves a longitudinally split or divided tubular casing 13 formed at its ends with supplemental internal collars 14. Within the tube 13 is a heavy coiled cushioning spring 15, the ends of which fit within grooves formed in the collars 14, so that the said spring, at its ends, is rigidly anchored to the ends of the said tube 13. The tube 13, at its lower end, is provided with ears 16 that are pivotally connected, by a bolt 17, to a lug 18, rigidly secured directly on top of the crank shaft casing 9. The sections of the tube 13 are shown as provided with upper and lower pairs of lugs 19 through which bolts 20 are applied to rigidly but detachably hold together the sections of the said tube.

Working through the upper portion of the spring 15 and through the upper end of the tube 13, is a thrust rod 21, the upper end of which is pivotally connected by a bolt 22, to depending lugs 23, formed on or rigidly secured to the intermediate portion of the link 11. The lower end of this thrust bolt 21 is provided with a head 24 having a spiral groove that engages the intermediate portion of the spring 15. When the bolt 22 is removed, the thrust rod 21 may be rotated to thereby vertically adjust the said rod in respect to the spring 15 and spring tube or casing 13. Such adjustments serve to vertically adjust the central portion of the machine frame, including the crank shaft hanger. With the spring 15 anchored at both ends and the thrust rod 21 connected to the intermediate portion thereof, there are provided, in effect, two springs, one of which always acts in compression and the other in tension. For instance, under downward strains from the weight of the rider or load, the upper part of the said spring will be compressed and the lower part will be stretched, and under recoil, there is a reverse relative action, and the lower section of the spring cushions the movement imparted by the upper section. Also, it is evident that by vertical adjustments of the thrust rod, that part of the spring which is above the head of said thrust rod and which acts in compression, to carry the load, may be increased or decreased in length. Hence, practically any desired adjustment of the spring is made possible, and there is always in action, two springs or two sections of a single spring that extends above and below the head of the thrust rod. Obviously, when the thrust rod is connected to the coupling link 11 by the bolt 22, it cannot rotate, and hence, cannot change its adjustment in respect to the spring.

With the spring connection applied between the coupling link and crank shaft hanger, an extra bracket on the seat post tube 2 is dispensed with, and furthermore, when the bolts at 10 and 12 are removed, the rear section of the frame may be separated from the main or front section of the frame, without requiring the spring connection to be disconnected at any point or at either end.

The improved spring connection or attachment described may be easily applied, may be constructed at small cost, and furthermore, is highly efficient for the purposes had in view.

What I claim is:

1. In a frame of the kind described, a cushioning connection comprising a coiled spring anchored at its ends, and an endwise movable thrust rod connected to the intermediate portion of said spring, so that one end section of said spring operates in compression while the other operates in tension.

2. In a frame of the kind described, a cushioning connection comprising a coiled spring anchored at its ends, and an endwise movable thrust rod connected to the intermediate portion of said spring, so that one end section of said spring operates in compression while the other operates in tension, the said thrust rod being adjustable so as to vary the point of connection between the same and the said spring.

3. In a frame of the kind described, a cushioning connection comprising a coiled spring anchored at its ends, and an endwise movable thrust rod having a spirally grooved head adjustably connected to the intermediate portion of said spring, substantially as described.

4. In a frame of the kind described, a spring connection comprising a spring casing, a coiled spring in said casing having its ends anchored to the ends of said casing, and a thrust rod movable endwise in said casing and having a spirally grooved head adjustably connected to the intermediate portion of said spring, substantially as described.

5. In a frame of the kind described, a spring connection comprising a longitudinally split spring casing, a coiled spring in said casing having its ends anchored in grooves formed in the ends of the section of said casing, and a thrust rod movable endwise in said casing and connected to the intermediate portion of said spring, substantially as described.

6. In a frame of the kind described, the combination with a front section having a seat post tube, of a rear frame section having a rigidly secured crank shaft hanger pivotally connected to said seat post tube, and having upper members, a coupling link pivotally connected to said seat post tube and to the upper member of said rear frame section, and a cushioning connection applied between said coupling link and crank shaft hanger.

7. In a frame of the kind described, the combination with a seat post tube, of a crank shaft hanger pivotally connected to the lower end of said seat post tube, a coupling link pivotally connected to the upper portion of said seat post tube, rear forks having lower tubes rigidly connected to said crank shaft hanger, upper tubes pivotally connected to said rear forks and to said coupling link, and a cushioning connection pivoted at its upper end to said coupling link and at its lower end to said crank shaft hanger, substantially as described.

In testimony whereof I affix my signature in presence of two witnesses.

JOSEPH M. MICHAELSON.

Witnesses:
 HARRY D. KILGORE,
 F. D. MERCHANT.

---

Copies of this patent may be obtained for five cents each, by addressing the "Commissioner of Patents, Washington, D. C."